United States Patent
McLeod et al.

(10) Patent No.: US 6,437,916 B1
(45) Date of Patent: Aug. 20, 2002

(54) STRAIN-STABILIZED BIREFRINGENT CRYSTAL

(75) Inventors: Robert R. McLeod, Morgan Hill; Adam Cohen, Fremont, both of CA (US)

(73) Assignee: JDS Uniphase Corporation, Nepean (CA)

( * ) Notice: Subject to any disclaimer, the term of this patent is extended or adjusted under 35 U.S.C. 154(b) by 0 days.

(21) Appl. No.: 09/727,439

(22) Filed: Dec. 4, 2000

Related U.S. Application Data

(60) Provisional application No. 60/238,440, filed on Oct. 10, 2000.

(51) Int. Cl.$^7$ ................................................. G02B 5/30
(52) U.S. Cl. ..................... 359/499; 359/494; 359/497; 359/900
(58) Field of Search ................................. 359/494, 499, 359/500, 497, 498, 900

(56) References Cited

U.S. PATENT DOCUMENTS

| | | | | |
|---|---|---|---|---|
| 3,439,974 A | * | 4/1969 | Henry et al. ................. 359/288 |
| 4,732,480 A | * | 3/1988 | Fortunato et al. ........... 356/453 |
| 4,744,075 A | | 5/1988 | Buhrer ........................... 370/3 |
| 4,745,591 A | | 5/1988 | Foley ............................ 370/3 |
| 4,890,922 A | | 1/1990 | Wilson ........................ 356/350 |
| 5,040,896 A | | 8/1991 | Moslehi ....................... 356/351 |
| 5,134,882 A | | 8/1992 | Taylor ....................... 73/517 R |
| 5,175,787 A | | 12/1992 | Gualtieri et al. ............. 385/130 |
| H1155 H | | 3/1993 | Fratello et al. .............. 359/484 |
| 5,561,522 A | | 10/1996 | Rapoport et al. ............ 356/351 |
| 5,588,014 A | * | 12/1996 | Okazaki ....................... 372/22 |
| 5,615,224 A | * | 3/1997 | Cohen ......................... 372/36 |
| 5,912,457 A | * | 6/1999 | McQuaid ..................... 356/33 |
| 5,982,488 A | * | 11/1999 | Shirasaki ..................... 356/454 |
| 6,081,641 A | * | 6/2000 | Chen .......................... 359/494 |
| 6,084,708 A | * | 7/2000 | Schuster ..................... 359/500 |
| 6,252,716 B1 | * | 6/2001 | Paiam ........................ 359/115 |
| 6,269,202 B1 | * | 7/2001 | Lee et al. ...................... 385/24 |
| 6,304,383 B1 | * | 10/2001 | DeBoynton et al. ........ 359/579 |

* cited by examiner

Primary Examiner—Cassandra Spyrou
Assistant Examiner—John Juba, Jr.
(74) Attorney, Agent, or Firm—Lacasse & Associates, LLC

(57) ABSTRACT

The invention provides an optical system for use in a stable, temperature-insensitive birefringent crystal interferometer (BCI). The optical system includes a first block of light transmissive birefringent material having an input port and an output port, the material having in the spectral region of desired device operation a net retardance at a first temperature, and straining means for inducing a strain in one of the first block and a second block of light transmissive material optically coupled to the first block, the strain induced for maintaining the net retardance substantially unchanged from the net retardance at least a second other temperature. Advantageously, the optical system uses a single variety of crystal, which is cheaper, more robust, and has better performance than BCIs having two crystal varieties.

16 Claims, 5 Drawing Sheets

STRAIN-STABILIZED BIREFRINGENT CRYSTAL

RELATED APPLICATIONS

This application claims priority of U.S. Provisional Application No. 60/238,440 filed Oct. 10, 2000.

FIELD OF THE INVENTION

This invention relates generally to birefringent crystals, and more particularly, to a temperature-stabilized birefringent crystal for use in stable, temperature-independent birefringent crystal interferometers.

BACKGROUND OF THE INVENTION

Interferometers form the basis of a number of important communications devices including interleavers, dispersion compensators, and periodic filters. The basic function of an interferometer is to split coherent light into two paths with possibly different propagation delays and then to recombine the light from these two paths.

If the coherence length of the light source is longer than the difference in the path lengths on the two arms, interference of the two optical signals at the output provides a sensitive measure of the difference in the propagation delays on the two arms. If the frequency of the input light source is swept, the interferometer reveals a periodic transmission with a frequency period of $$v_o = \frac{c}{n_1 l_1 - n_2 l_2} \quad (1)$$

where c is the speed of light in free space, $n_i$ and $l_i$ are the optical index and physical path length of the two arms i=1,2. This quantity is typically referred to as the interferometer free spectral range (FSR).

To provide stable operation, both $n_i l_i$ products must be stable to much better than one wavelength of light. At optical communications wavelengths, this leads to a stability requirement on the order of 10 nm, which is difficult to maintain. It is known in the art that a birefringent crystal interferometer (BCI) can be designed to provide such stable path lengths.

In BCIs comprising uniaxial birefringent crystalline material, the two "paths" are simply the optical paths of the two orthogonal linear polarizations propagating through the material. Since one polarisation experiences the extraordinary refractive index, $n_e$, and the other the ordinary refractive index, $n_o$, the path difference, also known as the retardance, is given by $\Delta n l$, where the birefringence, $\Delta n$, is given by $n_e - n_o$ for a material having positive dielectric anisotropy. The interferometer FSR is now given by:

$$v_o = \frac{c}{\Delta n l} \quad (2)$$

Since $l_1 = l_2 =$ automatically, only changes in the birefringence, $\Delta n$, and the total crystal length, l, can affect the operation of the interferometer. In fact, changes in temperature modify both of these properties, to an extent characterised by the physical parameters of thetno-optic coefficients (in fact, the difference of the two thermo-optic coefficients relating to $n_o$ and $n_e$) and the coefficient of thermal expansion (CTE) in the direction of light propagation.

One solution to the temperature dependence has been proposed by Kuochou Tai et al. in copending application No. 09/476,034, to the same assignee. Kuochou Tai et al. teach cascading two crystals of different material in such a way that the two crystal BCI is independent of temperature. For example, an appropriately selected Yttrium ortho-Vanadate ($YVO_4$) crystal followed by an appropriately selected rutile ($TiO_2$) crystal provides an interferometer that is stable to both thermal and mechanical perturbations.

However, the proposed method has several disadvantages.

First, it is difficult to manufacture both crystal lengths with sufficient accuracy. To overcome this limitation, pairs of crystals are picked so that the combination has the Second, although this pair of crystals is selected to have the desired FSR and to be temperature stable, they typically do not resonate precisely at the optical frequency of interest (typically a channel on the ITU grid). To adjust the resonant frequency of the interferometer, the current practice is to add a thin piece of quartz (typically in the range of 180 to 210 microns). Accordingly, each crystal pair must be measured and an appropriate quartz piece selected to adjust the resonant frequency.

Finally, if during mounting, one of the crystals is rotated relative to the other, it is possible for the effective length and/or the effective indices of refraction (and hence effective birefringence) to change, introducing undesirable changes into the FSR and its temperature dependence.

It is an object of this invention to provide a birefringent crystal whose retardance is independent of temperature, for use in a thermally stable BCI that obviates the disadvantages of prior art.

It is a further object of this invention is to provide an optical retardance system that can be used in a stable, temperature independent BCI for use in interleavers, periodic filters, and/ or dispersion compensators.

SUMMARY OF THE INVENTION

The instant invention relates to a stable, temperature-insensitive birefringent crystal interferometer (BCI) that uses a single variety of crystal and that can be used in an interleaver, a periodic filter, and/or a dispersion compensator. In comparison to BCIs that use two crystal varieties, the resulting device is cheaper, more robust, and has better performance.

In accordance with the invention there is provided an optical system comprising: a first block of light transmissive uniaxial birefringent material having an input port and an output port, the material having a first retardance at a first temperature; and, straining means for inducing a strain in one of the first block and a second block of light transmissive material optically coupled to the first block, the strain induced for maintaining a second net retardance substantially unchanged from the first retardance at at least a second other temperature.

In accordance with the invention there is further provided a method for compensating a thermal drift of a birefringent material comprising the steps of: providing a first block of light transmissive birefringent material having a first retardance at a first temperature; and, maintaining a net retardance substantially equal to the first retardance at a second temperature by applying a stress to one of the first block of light transmissive birefringent material and a second block of light transmissive material.

In accordance with the invention there is further provided a method for compensating a thermal drift of a birefringent material comprising the steps of: providing a light transmissive element having a net retardance at a first temperature, the light transmissive element comprising a block of the birefringent material; and, maintaining the net retardance of the light transmissive element at a second other temperature by inducing a strain in at least part of the light transmissive element.

Conveniently, the term "net retardance" as used herein, refers to the net or total retardance in the spectral region of desired device operation.

BRIEF DESCRIPTION OF THE DRAWINGS

Exemplary embodiments of the invention will now be described in conjunction with the drawings in which.

DETAILED DESCRIPTION OF THE INVENTION

Figure 1:
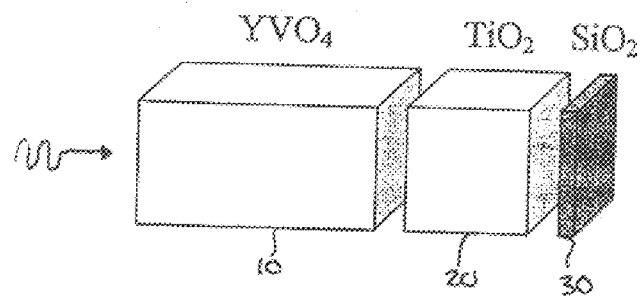
FIG. 1 is a schematic diagram of a prior art arrangement of a $YVO_4$ crystal, a $TiO_2$ crystal, and a $SiO_2$ plate for use in thermally stable birefringent crystal interferometer (BCI)

Referring to FIG. 1 there is shown a prior art optical system for use in a birefringent crystal interferometer (BCI) having two varieties of birefringent crystals. A first $YVO_4$ birefringent crystal 10 is disposed adjacent a second $TiO_2$ birefringent crystal 20. The composition and length of each birefringent crystal is selected to have a predetermined free spectral range (FSR) and to provide thermal stability. A quartz ($SiO_2$) plate 30 is disposed adjacent the second birefringent crystal 20 to adjust the resonant frequency of the interferometer by a small amount. Light is shown to propagate from left to right. Typically, the c axis of the crystal is in the plane perpendicular to the optical path.

Figure 2:
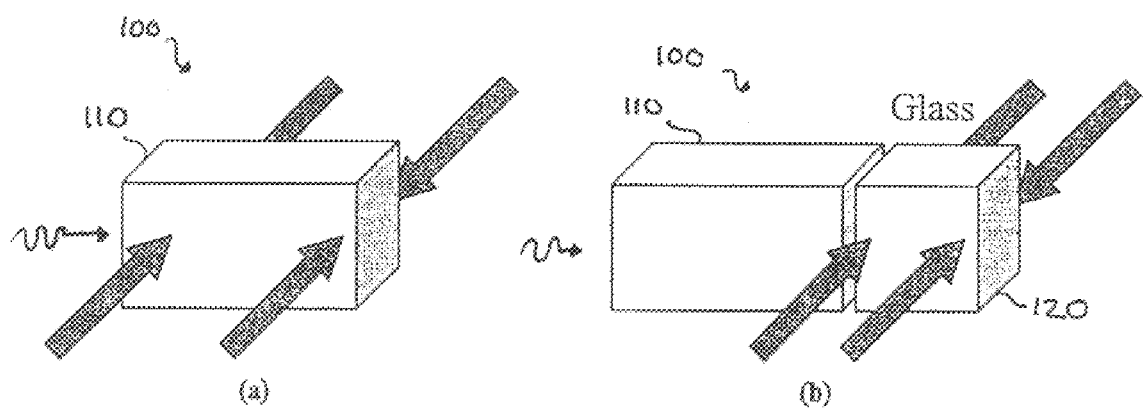
FIG. 2a is a schematic diagram of a single birefringent crystal for use in thermally stable BCI in accordance with the instant invention.
FIG. 2b a schematic diagram of a single birefringent crystal and a glass block for use in a thermally stable BCI in accordance with the instant invention.

Turning to FIG. 2, there are shown two different embodiments of an optical system 100 for use in a birefringent crystal interferometer in accordance with the instant invention, having a single variety of birefringent crystal 110. Superior temperature stabilizing and frequency tuning of the BCI is accomplished by virtue of the elastooptic effect, wherein the birefringence of a material is changed by inducing a strain in the material. In the instant invention, the birefringent crystal is temperature-stabilized by inducing a strain in one of the crystal and another optical element optically coupled to the crystal.

Referring to FIG. 2a, a temperature-dependent, uniform, strain field, depicted by thick arrows, is shown incident on a single birefringent crystal 10 in a direction transverse to the direction of optical propagation. The strain field induces a change in the birefringence of the crystal 110, and modifies the free spectral range (FSR) of the interferometer through equation 2. For any particular temperature dependence of the strain-free FSR, it is possible to solve for a required strain as a function of temperature that compensates this change, resulting in a temperature-stabilized BCI.

Referring to FIG. 2b, the temperature-dependent, uniform, strain field, is shown incident on a separate compensating plate 120 fabricated from a normally isotropic material, such as a glass block, for providing a compensating, temperature dependent FSR. As the normally isotropic glass block 120 is subject to strain, it becomes birefringent. The retardance that results from this small additional birefringence exactly compensates the change in FSR of the crystal.

Although, this embodiment has the disadvantage of a second optical component, it provides several advantages in terms of flexibility.

First, since the only function of the glass block 120 is to compensate for thermal drift of the crystal, both the material and the size of the glass 120 is selected to provide best performance. This is in contrast to the embodiment shown in FIG. 2a, wherein the material and length of the crystal 110 are constrained by the desired FSR through equation 1.

Secondly, for a given strain, additional length of the compensator plate 120 provides additional shift of the resonant frequency since the retardance induced scales linearly with the length of material through which the light propagates. A corollary is that, in principle, this embodiment provides compensation for any crystal over any temperature range simply by increasing the glass length until the maximum required strain falls within acceptable limits.

Finally, this embodiment advantageously allows the crystal 110 to be strain free, thus reducing the chances of fracturing or otherwise damaging the crystal. Furthermore, since the crystal 110 is strain free, the choice of crystal and/or temperature range is based on efficiency, not on resistance to breakage or damage.

As is well known in the art, strain-induced birefringence is proportional to strain to a high degree of accuracy. The temperature-induced change in the FSR is also nearly linear with temperature. Therefore, it is required that the strain change linearly with temperature in order to cancel out the temperature shift of the FSR. According to one embodiment of the instant invention, this is accomplished by constraining the crystal 110 in FIG. 2a or the glass block 120 in FIG. 2b, in a metal mount with a thermal expansion different than that of the crystal 110 or glass block 120. Advantageously, this embodiment provides a substantially compact and self-stabilized BCI.

Figure 3:
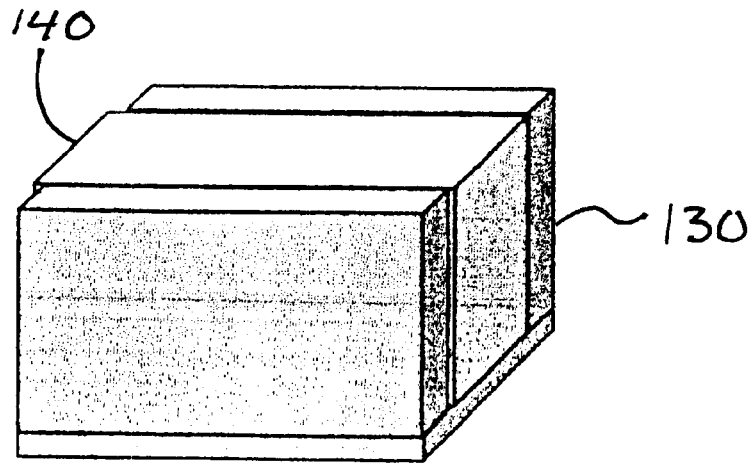
FIG. 3 is a schematic diagram showing an optical element in close contact with a mount having a different thermal expansion than the optical element for providing means for stress-induced birefringence in the optical element.
Figure 3A:
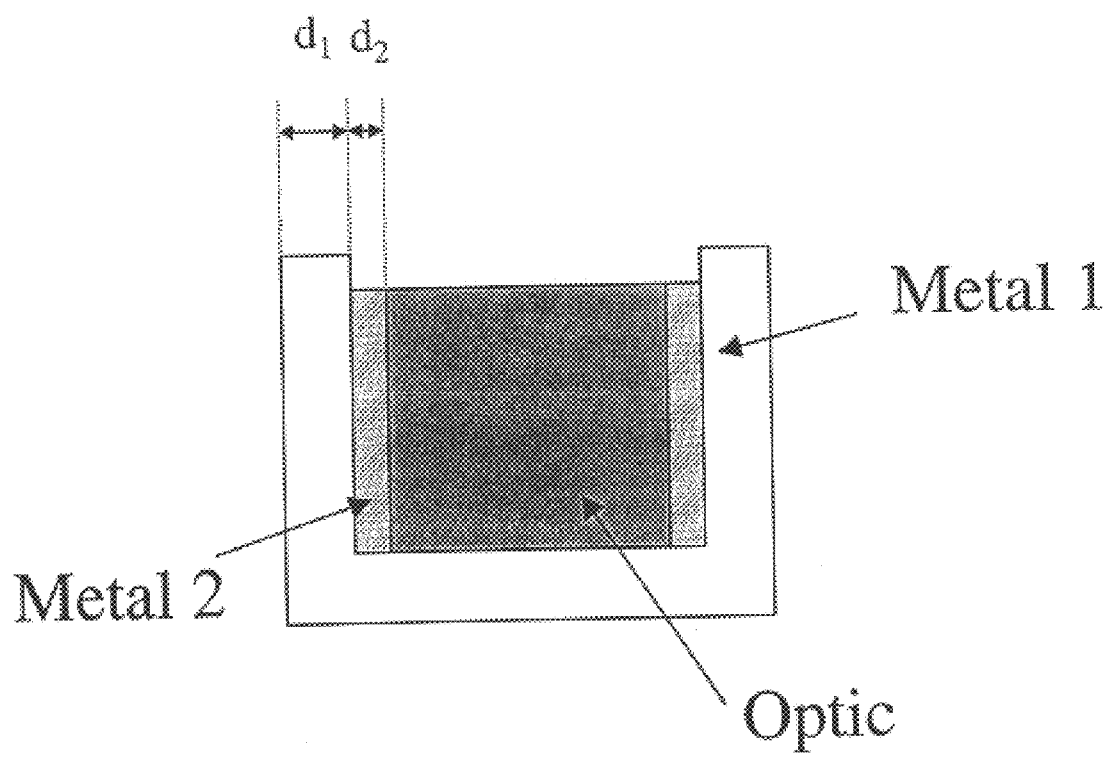
FIG. 3a is a cross-sectional view of a bimetallic mount and optical element.

Referring to FIG. 3, there is shown a mount 130 supporting an optical element 140, which is either the crystal 110 or glass plate 120. The mount 130, which is preferably a single metal or a combination of metals, as for example shown in FIG. 3a, is arranged to be in close contact with the optical element at all operating and storage temperatures of the device. As the temperature changes, the differing rates of thermal expansion of the optical element 140 and the metal mount 130 generate a strain in the optical element 140 that changes linearly with temperature, as required (i.e., the metal mount functions as straining means). Optionally, a bi- or multi-metallic mount is designed such that the strain applied to the optic as a function of temperature is a function of the weighted average of the CTEs and dimensions of the metals, as well as the Young's moduli of all materials. Although the mount 130 is depicted as having three sides for surrounding the rectangularly shaped optical element 140, 2 or 4 sides are also possible. Advantageously, the three-sided design provides a one-piece construction that allows the optical element 140 to be easily placed therein. Preferably, the mount provides at least two opposing sides for providing compressive strain in the crystal.

Preferably, the strain field throughout the element 140 is uniform in order to generate uniform birefringence and to reduce excess stress that could damage the optical element 140. To provide this uniform loading, a thin compliant layer between the mount and the crystal is optionally provided. This pad deforms in response to local non-uniform stress and therefore improves the uniformity of contact between the optical element 140 and the mount 130. Moreover, the thermal conductivity of the mount 130 is preferably large to minimize any possible thermal gradients within the mount that create non-uniform loading of the crystal by the mount, or non-uniformities in temperature-dependence of the retardance of the optical material.

It is further preferred that strain fields in directions other than that intended be minimized. For example, when the strain is induced in a direction perpendicular to the optical signal as illustrated in FIG. 2, shear strain in the crystal due to the thermal expansion of the crystal and mount is preferably controlled.

In order to reduce large stresses that typically form near the corners of the optical element 140 in the mount 130, the corners of the optical element are optionally rounded or chambered.

Depending on the sign of the effective elastooptic coefficient of the optical element 140 under strain and the sign of the FSR shift of the optical element 140 with temperature, the strain in the optical element 140 increases or decreases linearly with temperature.

Figure 4:
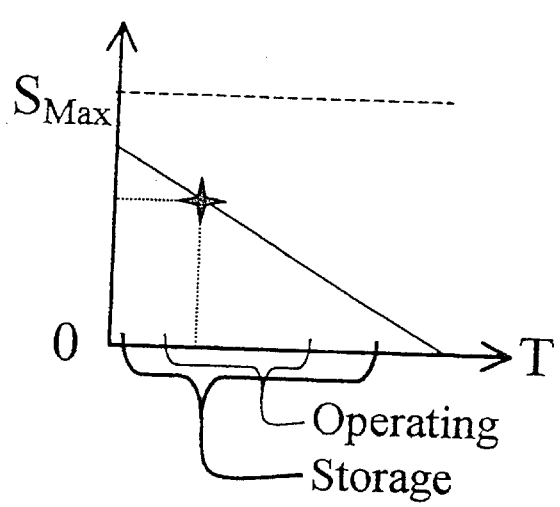
FIGS. 4a and 4b are graphs showing the dependence of strain (S) on temperature (T) in accordance with the instant invention.
Figure 4:
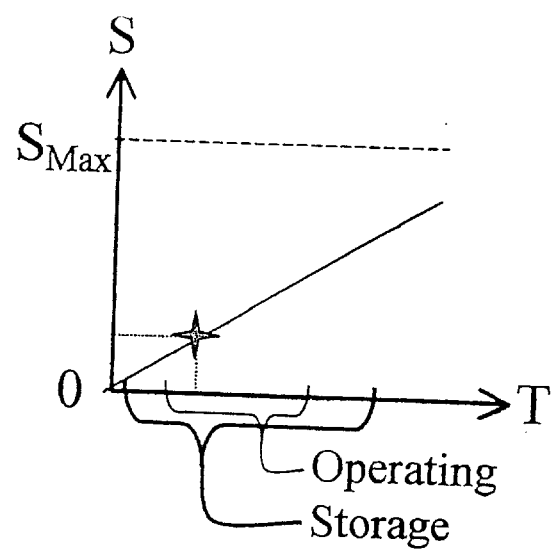

Referring to FIGS. 4a and 4b, the dependence of strain (S) on temperature (T) is shown. The sign of the slope in FIG. 4 may be calculated by comparing the magnitude of the thermal expansion of the optical element 140 to that of the mount 130. For example, if the mount has a larger thermal expansion than the optical element then the strain will decrease with increasing temperature (FIG. 4a), whereas if the thermal expansion of the mount is smaller than the thermal expansion of the optical element then the strain will increase linearly with temperature (FIG. 4b).

As shown in FIG. 4, the pre-load at room temperature (marked by a star) is set so that, over the storage temperature range of the device, the strain never exceeds the damage threshold of the material or decreases lower than zero, the latter of which causes the mount 130 and the optical element 140 to separate. This pre-load has the second important property of adjusting the resonant frequency of the BCI, in analogy to the quartz plate 30 described in the prior art. To achieve the largest change in resonant frequency for a given strain, in the absence of a temperature change, it is advantageous to arrange the mutual orientation of the optical element 140 and the mount 130 to harness the largest effective elastooptic coefficient. This coefficient is calculated for the different possible orientations by someone of ordinary skill in the art. To generate the largest strain from a particular optical element 140 and mount 130 material, it is advantageous to orient the optical element 140 to have the largest compliance aligned to the direction of the induced strain. Of course, these considerations are not important for normally isotropic materials such as the glass block 120.

Figure 5:
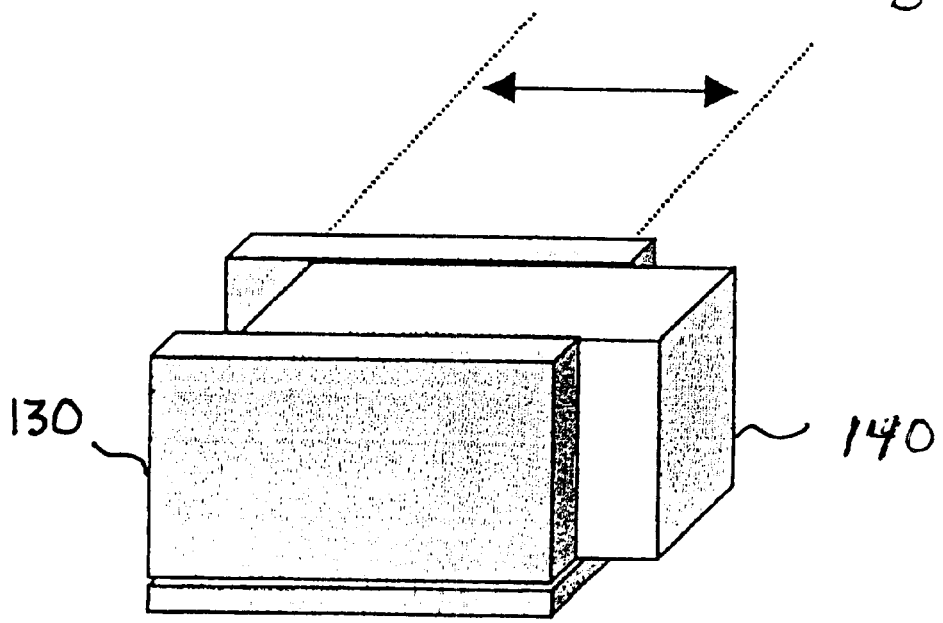
FIG. 5 is a schematic diagram showing the optical element and mount in FIG. 3 disposed such tantamount of stress-induced birefringence is varied by changing an interaction length between the optical element and the mount.
Figure 5A:
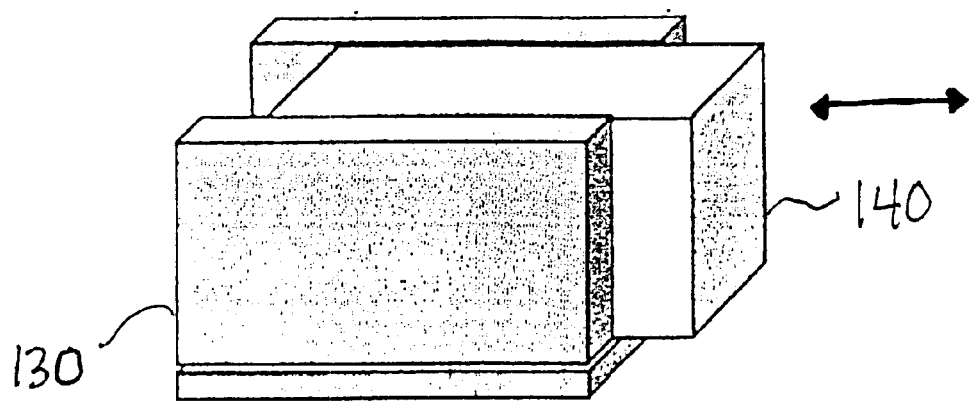
FIG. 5a is a schematic diagram showing the optical element and mount in FIG. 5, wherein the optical element is movable relative to the mount.
Figure 5B:
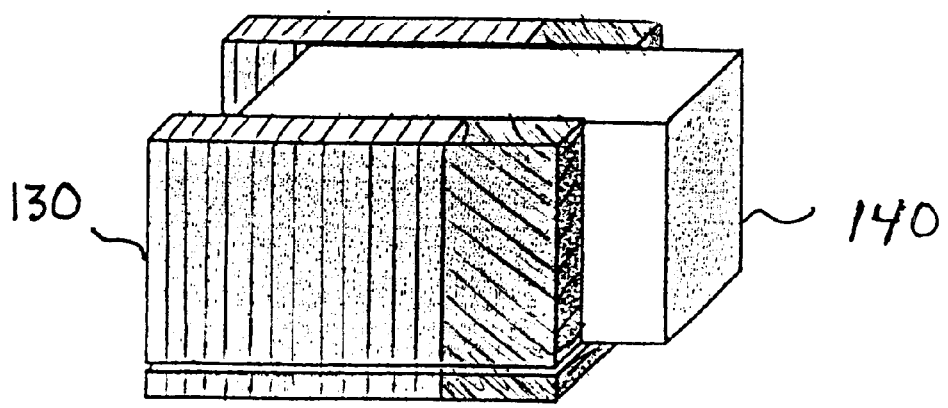
FIG. 5b is a schematic diagram showing the mount in FIG. 5 being constructed from two different metals.

Referring to FIG. 5, an alternate method of adjusting the strain-induced birefringence is shown. In this embodiment, the effective interaction length of the optical element 140 is adjusted by sliding it with respect to the mount 130. Since the strain-induced change in the retardance $\delta(\Delta n \cdot L_i)$ is proportional to the interaction length $L_i$, another means, in combination with appropriate design for mount-applied strain, for adjusting both the initial total retardance (to adjust for the fabrication tolerance of the crystal length) and the slope of the retardance change with temperature (to adjust for material property variations), is provided. Preferably, the mounting scheme is designed to avoid any non-uniformity in applied strain field at the peripheral parts of the portion of the optic that are in direct contact with the mount. For example, in addition to actively moving the optical element 140 relative to the entire mount as shown in FIG. 5a in order to change the interaction length, the mount could be constructed from two or more metals as shown in FIG. 5b. Motion of the optic relative to the mount in the direction of light propagation then varies the relative areas of contact with the various metals and hence varies the applied strain. Notably, the bimetallic mount shown in FIG. 5b is not limited to the embodiment shown in FIG. 5, but is a useful alternative to the mount described above for any embodiment where a weighted average of the strain provided by two or more different metals is required.

Advantageously, the strain-stabilized BCI in accordance with the instant invention has fewer optical parts, thus reducing materials cost, assembly time, and optical insertion loss, while increasing reliability. Greatly reduced complexity of construction is provided by eliminating the need to measure a pool of each of two crystal types and pick appropriate crystals plus a quartz plate to achieve the desired FSR and resonant frequency.

Furthermore, the instant invention provides a method of setting the resonant frequency (the facility to continuously adjust and then fix the applied 'pre-load' strain at the nominal operating temperature) that is both more accurate and precise in comparison to the discrete tuning provided by a finite set of quartz plates. Also, the instant apparatus and method removes any error in the FSR caused by mounting, since the adjustment is made on the mounted crystal.

Moreover, the instant invention provides a more accurate control of the temperature-dependence of the BCI. Since the temperature compensation in the invention is controlled by the relative thermal expansions of the optical element and its mount, the limitation on stability is set by the repeatability of these expansions. Since the composition of crystal, glass, and metal materials is substantially repeatable, the thermal stability of the system is accurately controlled. In contrast, the thermal stability of the two-crystal BCI is set by length fabrication tolerances that are at the edge of the state-of-the-art.

Although the instant invention has been described using compressive strain, it is obvious to one skilled in the art, that tensile (stretching) or shear strain could produce an identical effect. For example, tensile strain may be more appropriate for very thin compensating plates (e.g. a thin plastic sheet).

Similarly, the instant invention disclosed herein includes a method of modifying the temperature dependence of a BCI by inducing strain in a crystal or an isotropic material that then becomes weakly birefringent under the strain. Clearly, these concepts are combinable with any other temperature stabilization or resonant-frequency tuning technique.

Preferably, the strain is induced by applying a stress in a direction traversing the propagation of light, however, other directions are possible. The term "stress" as used herein refers to a force exerted when one body, or a part of one, presses upon, pulls upon, pushes against, or tends to stress, compress, or twist another body or part of one. Although, it is most convenient to apply a stress in one axis, perpendicular to the direction of optical propagation, it is also possible to apply a stress in both perpendicular directions or, with appropriate mounting, parallel to the direction of optical propagation. Accordingly, the straining means includes any apparatus capable of asserting a stress on one of the crystal 110 and the glass block 120. For example, active straining means such as a device using piezo-electric transducers to apply stress to the optical element 140 is possible.

The simple linear expansion of all physical effects described here results in a requirement for a linear variation of strain with temperature. However, more complex (non-linear) functions are achieved by appropriate choice of materials. Advantageously, the non-linearity may be used to create some desired variation of the BCI FSR with temperature. Alternatively, nonlinear variations of the physical parameters (e.g. elastooptic coefficient, thermal expansion, or compliance) are balanced against one another to achieve a greater degree of temperature compensation.

Advantageously, in the embodiments described herein, the straining means are passive and the optical system including the temperature-stabilized crystal is absent any external feedback circuits. Further advantageously, the passive straining means provides a substantially constant net retardance of the light transmissive element(s) (e.g., the birefringent crystal or the combination of the birefringent crystal and the glass block) over a given temperature range and in the spectral region of desired device operation.

Of course, numerous other embodiments can be envisaged without departing from the spirit and scope of the invention

What is claimed is:

1. An optical system comprising:
   a first block of light transmissive birefringent material having an input port and an output port, the material having a first retardance at a first temperature; and
   straining means for inducing a strain in one of the first block and a second block of light transmissive material optically coupled to the first block, the strain induced for maintaining a second net retardance substantially unchanged from the first retardance at at least a second other temperature, wherein the straining means includes an element in contact with one of the first and second blocks, the element having a thermal expansion different than the block it is physically contacting, the straining means and the block it is in contact with being relatively movable.

2. The optical system as defined in claim 1, wherein the straining means is designed to apply one of a compressive, a tensile, and a shear stress.

3. The optical system as defined in claim 2, wherein the straining means is designed to apply stress in a direction substantially perpendicular or parallel to a direction of optical propagation.

4. The optical system as defined in claim 1, wherein the straining means is passive.

5. The optical system as defined in claim 1, wherein a strain-induced change in a retardance $\delta(\Delta n \cdot L_i)$ in one of the first and second blocks is proportional to an interaction length $L_i$ between the element and the block it is in contact with.

6. The optical system as defined in claim 5, wherein the straining means and the block it is in contact with are relatively movable for changing the interaction length $L_i$.

7. The optical system as defined in claim 6, wherein the element is a mount for supporting the block it is in contact with on three sides.

8. The optical system as defined in claim 7, wherein the mount is made of at least one metal.

9. The optical system as defined in claim 8, wherein the at least one metal is selected to have a thermal conductivity for minimizing a thermal gradient within the straining means for ensuring a uniformity of loading and a uniformity of thermal response of the block it is in contact with.

10. The optical system as defined in claim 9, further including a compliant layer between the mount and the block it is in contact with for providing uniform strain.

11. The optical system as defined in claim 9, wherein the second block of light transmissive material is isotropic.

12. The optical system as defined in claim 9, wherein one of the first block and the second block has chambered corners.

13. An optical system comprising:
    a first block of light transmissive birefringent material having an input port and an output port, the material having a first retardance at a first temperature; and
    straining means for inducing a strain in one of the first block and a second block of light transmissive material optically coupled to the first block, the strain induced for maintaining a second net retardance substantially unchanged from the first retardance at at least a second other temperature, wherein the second block of light transmissive material is isotropic.

14. A method for compensating a thermal drift of a birefringent material comprising the steps of:
    providing a light transmissive element having a net retardance at a first temperature, the light transmissive element comprising a block of the birefringent material; and
    maintaining the net retardance of the light transmissive element at a second other temperature by inducing a strain in at least part of the light transmissive element wherein the light transmissive element further comprises a block of isotropic material, and wherein the step of maintaining the net retardance of the light transmissive element includes inducing a strain in the block of isotropic material.

15. An optical system comprising:
    a first block of light transmissive birefringent material having an input port and an output port, the material having a first retardance at a first temperature; and
    straining means for inducing a strain independently in the first block and a second block of light transmissive material optically coupled to the first block, but not both, the strain induced for maintaining a second net retardance substantially unchanged from the first retardance at at least a second other temperature.

16. The optical system of claim 15 wherein the second block is isotropic.

* * * * *

UNITED STATES PATENT AND TRADEMARK OFFICE
CERTIFICATE OF CORRECTION

PATENT NO. : 6,437,916 B1
DATED : August 20, 2002
INVENTOR(S) : McLeod et al.

It is certified that error appears in the above-identified patent and that said Letters Patent is hereby corrected as shown below:

Column 1,
Line 61, "thetno-optic" should read -- thermo-optic --

Column 2,
Line 11, "has the " should read -- has the desired FSR --

Column 3,
Line 33, "tantamount of" should read -- that an amount of --

Signed and Sealed this

Fourteenth Day of January, 2003

JAMES E. ROGAN
*Director of the United States Patent and Trademark Office*